United States Patent
Van Der Schaar et al.

(10) Patent No.: US 6,697,426 B1
(45) Date of Patent: Feb. 24, 2004

(54) REDUCTION OF LAYER-DECODING COMPLEXITY BY REORDERING THE TRANSMISSION OF ENHANCEMENT LAYER FRAMES

(75) Inventors: Mihaela Van Der Schaar, Ossining, NY (US); Hayder Radha, Mahwah, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 562 days.

(21) Appl. No.: 09/685,549

(22) Filed: Oct. 10, 2000

Related U.S. Application Data
(60) Provisional application No. 60/190,368, filed on Mar. 17, 2000.

(51) Int. Cl.[7] ................................................. H04N 7/18
(52) U.S. Cl. ............................ 375/240.01; 375/240.11; 375/240.12
(58) Field of Search ......................... 375/240.01–240.27

(56) References Cited

U.S. PATENT DOCUMENTS

| | | | |
|---|---|---|---|
| 5,742,343 A | 4/1998 | Haskell et al. .............. 348/415 |
| 5,946,037 A | 8/1999 | Ahnn .......................... 348/384 |
| 6,526,177 B1 * | 2/2003 | Haskell et al. .............. 382/243 |
| 6,535,559 B2 * | 3/2003 | Yagasaki et al. ........ 375/240.12 |

OTHER PUBLICATIONS

Nakamura M. et al, "Scalable Coding Schemes Based on DCT and MC Prediction", Procredings of the International Conference on Image Processing, Oct. 1995, pp. 575–578, (Abstract).

* cited by examiner

Primary Examiner—Andy Rao (57) ABSTRACT

The present invention is directed to rearranging the transmission order of the enhancement-layer frames. By making the display and transmission order of the enhancement layer frames identical, a frame memory is not required on the decoder-side to hold the enhancement-layer frame until being displayed since the display can take place immediately after the decoding. Reducing the amount of memory is desirable for mobile applications or other low-power consumption devices.

7 Claims, 8 Drawing Sheets

DISPLAY ORDER

TRANSMISSION ORDER

REDUCTION OF LAYER-DECODING COMPLEXITY BY REORDERING THE TRANSMISSION OF ENHANCEMENT LAYER FRAMES

CROSS REFERENCE TO RELATED APPLICATIONS

The present application claims the benefit of U.S. Provisional Application Serial No. 60/190,368, filed on Mar. 17, 2000.

BACKGROUND OF THE INVENTION

The present invention generally relates to video coding, and more particularly to rearranging the transmission order of enhancement layer frames.

Figure 1:
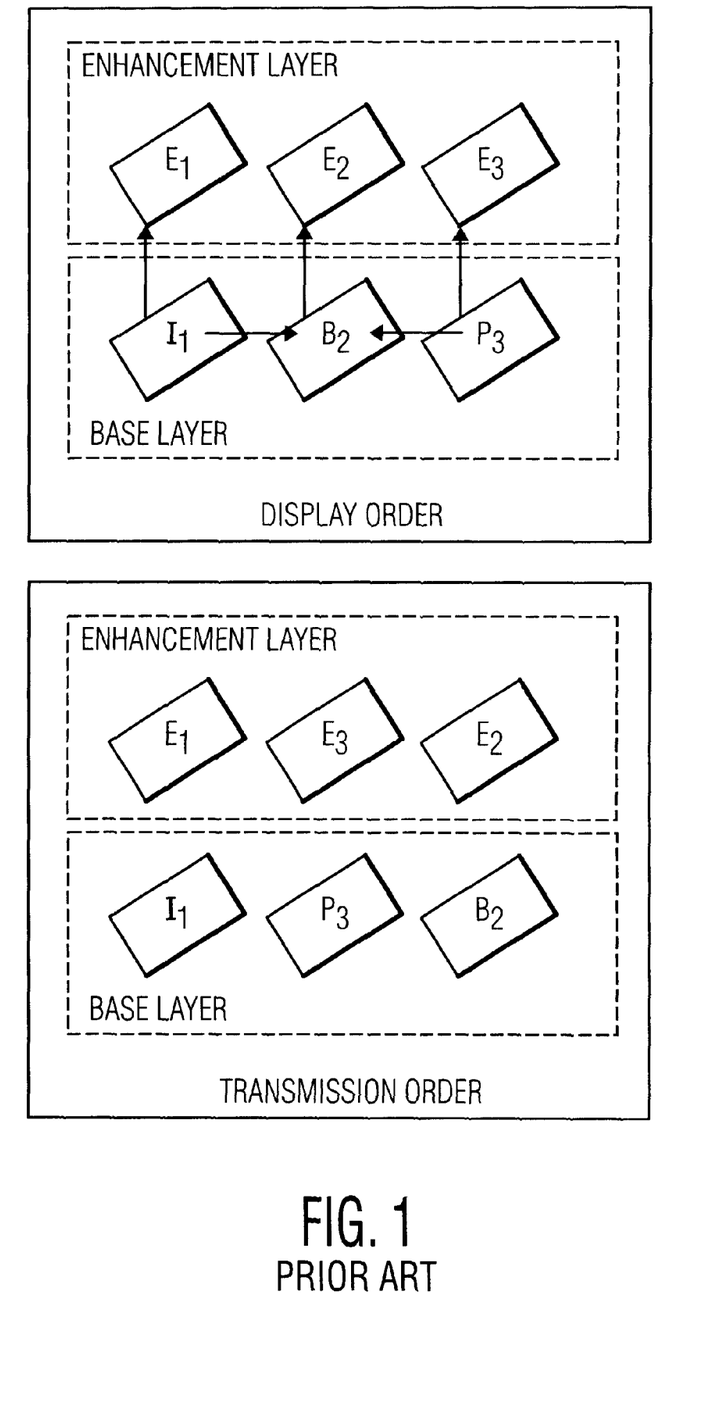
FIG. 1 is a diagram showing the transmission and display order for a conventional encoding system.

In MPEG-4 base-layer decoders as well as MPEG-2 decoders for that matter, the transmission order of the various frames differs from the display order. An example of this is shown in FIG. 1. As can be seen, the transmission order of both the base layer frames and corresponding enhancement layer frames differs from the display order.

The reason for the rearrangement of the frames of FIG. 1 is that the bi-directional motion compensation (MC) employed for the B-frames requires the anchor frames (I and P-frames) on which the prediction is made to be already available in the memory at the encoder/decoder side, when the B-frames are encoded/decoded. This requires that the I- and P-frames to be transmitted to the decoder prior to the B-frames. However, since the B-frames is typically displayed between the I- and P-frames, the transmission and display order of the frames are different due to the MC-prediction.

Figure 2:
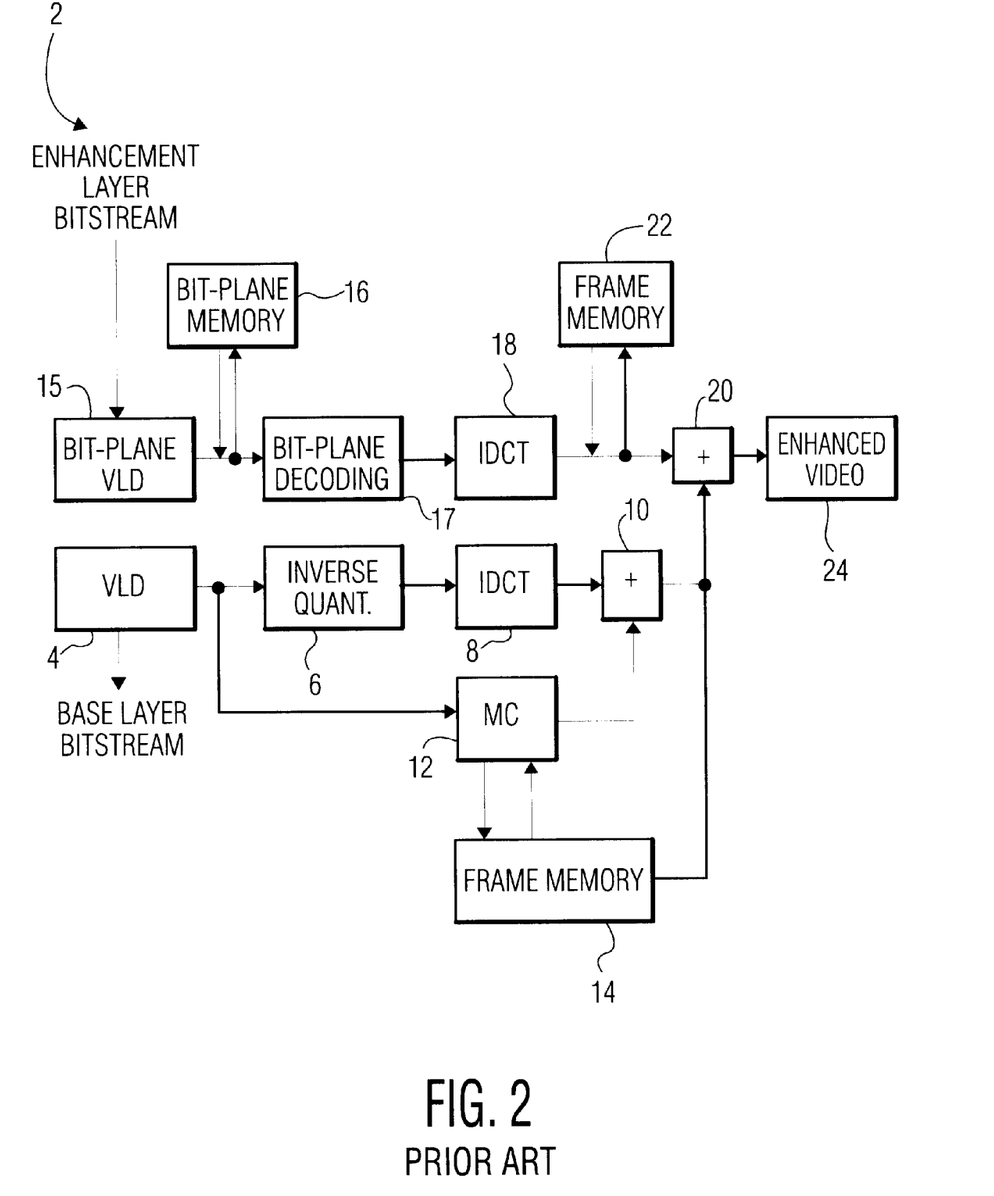
FIG. 2 is a block diagram showing one example of a decoder.

A block diagram of one example of a scalable (layered) decoder is shown in FIG. 2. During operation, the decoder 2 receives the encoded base and enhancement layer frames in the transmission order shown in FIG. 1. Further, the decoder 2 will decode and reorder these frames into the display order shown in FIG. 2.

As can be seen, the decoder 2 includes two separate paths for decoding the base layer and enhancement layer bit steams. Since these two paths are separate the decoding process of each of the two streams does not need to be synchronized.

The path for the base layer stream includes a variable length decoder 4, an inverse quantization block 6 and an inverse discrete cosine transform block (IDCT) 8 to convert the base layer bit-steam into picture frames. A motion compensation block 12 is also included for performing motion compensation on picture frames previously stored in a frame memory 14 based on the received motion vectors. Further, an adder 10 is also included to combine the outputs of the IDCT block 8 and the motion compensation block 12.

The path for the enhancement layer stream includes a variable length decoder (VLD 15, a bit plane decoding block 17 and another IDCT block 18 to convert the enhancement layer bit-steam into picture frames. During operation, the bit-plane decoding block 17 will decode the output of the variable length decoder 12 into individual bit planes using any suitable fine granular scalable decoding technique.

As can be further seen, a bit plane memory 16 is also included to store the individual bit planes until all of the bit planes for a current frame are decoded. Further, after the IDCT block 18 a frame memory 22 is included. The frame memory 22 is used to compensate for the encoded frames being received in a transmission order different from the display order, as shown in FIG. 1.

For example, if the enhancement layer frames are transmitted at the same time instance as the corresponding base-layer frames, the frame-memory 22 is required to store the enhancement-layer frames until its display time, which coincides with the base-layer display time. Referring back to the transmission order of FIG. 1, the enhancement picture $E_3$ after being decoded is stored in the frame memory 22 until after the enhancement frame $E_2$ is decoded and displayed. Thereafter, the enhancement frame $E_3$ is retrieved from the frame memory and than displayed. Therefore, in this manner, the transmission order of the frames is converted into the display order, as shown in FIG. 1.

The decoder 2 also includes another adder 20 to combine the picture frames from each of the paths in order to produce enhanced video 24. The enhanced video 24 can be either displayed immediately in real time or stored in an output frame memory for display at a later time.

SUMMARY OF THE INVENTION

The present invention is directed to a method for encoding video data. The method includes coding a portion of the video data to produce base layer frames. Also, coding another portion of the video data to produce enhancement layer frames. Further, rearranging the enhancement layer frames into a display order.

The present invention is also directed to a method for decoding a video signal including a base layer and an enhancement layer, where the enhancement layer includes enhancement frames arranged in a display order. The method includes decoding the base layer to produce decoded base layer frames. Also, decoding the enhancement layer to produce decoded enhancement layer frames and rearranging the decoded base layer frames into the display order. Further, combining the decoded base layer frames with the decoded enhancement layer frames without storing any of the decoded enhancement layer frames to form video frames.

BRIEF DESCRIPTION OF THE DRAWINGS

Referring now to the drawings were like reference numbers represent corresponding parts throughout.

DETAILED DESCRIPTION

The present invention is directed to rearranging the transmission order of coded enhancement-layer frames. By making the display and transmission order of the enhancement layer frames identical, a frame memory is no longer necessary at the decoder-side to hold the enhancement-layer frames until being displayed since the display can take place immediately after the decoding. Reducing the amount of memory is desirable for mobile applications or other low-power consumption devices.

In the conventional encoding system, where the enhancement layer transmission order is the same as for the base-layer, more than two frames stores are necessary for decoding. Referring to FIG. 1, one frame memory is used to store the $E_1$ frame, one frame memory is used to store the $E_3$ frame (which has been decoded, but cannot be displayed until $E_2$ is received, decoded and displayed) and one frame memory is used for the decoding and storing of $E_2$. However, according to the present invention, the memory to store the compressed $E_3$ data is no longer necessary.

Figure 3:
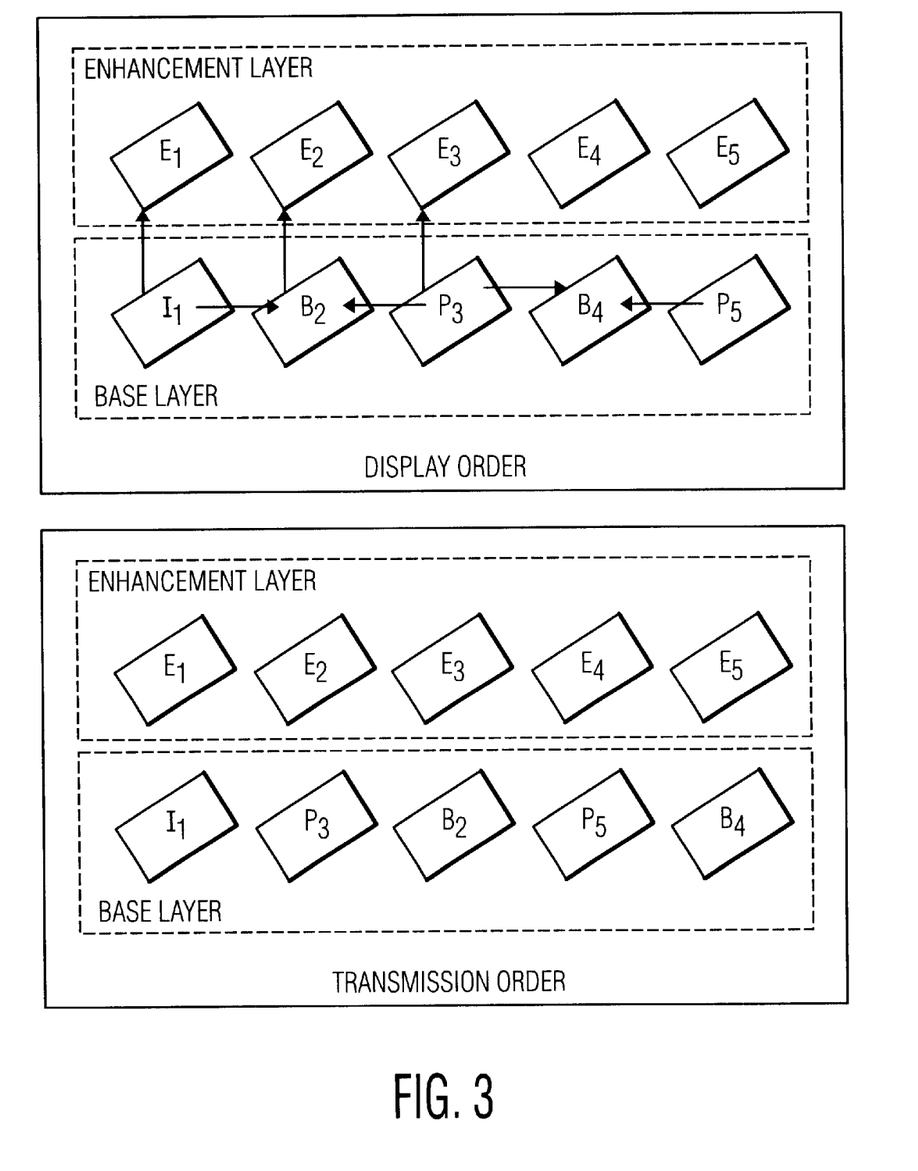
FIG. 3 is a diagram showing one example of the transmission and display order according to the present invention.

One example of the transmission and display order according to the present invention is shown in FIG. 3. For purposes of explanation, FIG. 3 only shows five base layer frames and corresponding enhancement layer frames. However, it should be noted that in an actual system the present invention would be applied to a variety of different groups of picture (GOP) structures.

As can be seen from FIG. 3, the transmission order of the base layer frames is same as in the conventional system shown in FIG. 1. However, according to the present invention, the transmission order of the enhancement frames has been rearranged to be the same as the display order of the enhancement frames on the decoder side, as shown in FIG. 3.

By rearranging the transmission order of the enhancement frames to be the same as the display order no local memory is necessary for the enhancement frames since the FGS frames are displayed immediately after the decoding. Of course, the display takes place after the FGS residual has been added to the base-layer frame.

Figure 4:
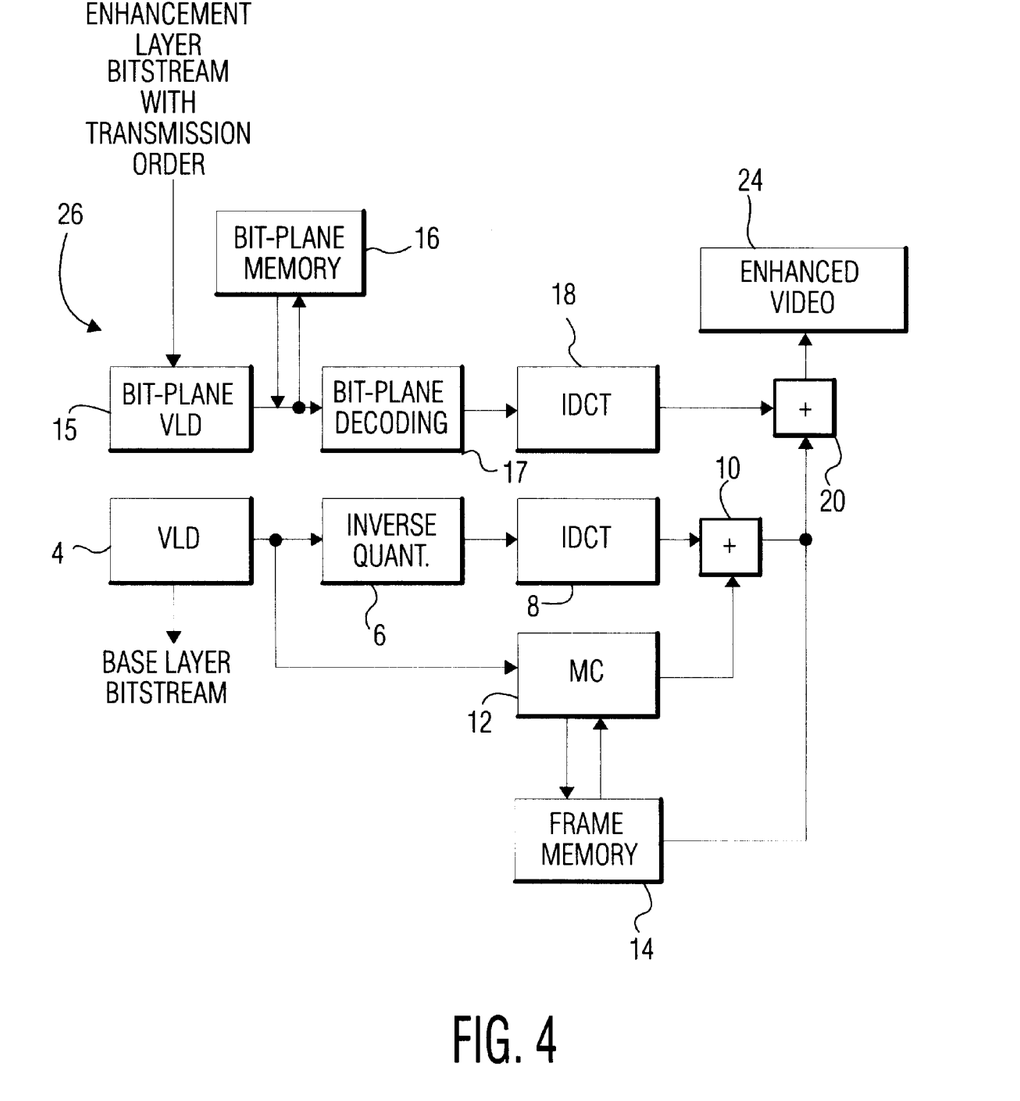
FIG. 4 is a block diagram showing one example of a decoder according to the present invention.

One example of a decoder according to the present invention is shown in FIG. 4. As can be seen, the decoder 26 of this figure is the same as the conventional decoder of FIG. 2 except that a frame memory 22 at the output of the IDCT block 18 is no longer required. As described above, this frame memory is no longer required since the transmission order of the enhancement frames has been rearranged to be the same as the actual display order of the frames. Therefore, the enhancement layer frames can be displayed in the ordered received after being combined with the base layer frames.

During operation, the decoder 26 will receive the base and enhancement layer frames in the transmission order shown in FIG. 3. However, in FIG. 3, the transmission order of the base layer frames is different than the enhancement layer frames. In order to compensate for this, the order of the base layer frames is changed and the timing of the enhancement layer frames is changed, as described below.

Figure 5:
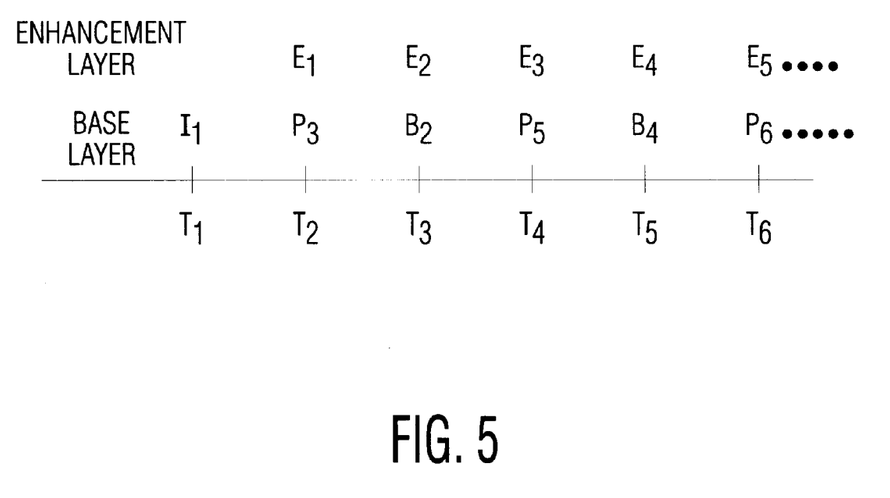
FIG. 5 is a diagram showing one example of the transmission timing of the frames according to the present invention.

One example of the transmission timing of the enhancement layer frames according to the present invention is shown in FIG. 5. As can be seen, the transmission timing of the enhancement layer frames is delayed with respect to the corresponding base layer frames. In the first time period, the base layer frame $I_1$ is transmitted. Since the transmission of the corresponding enhancement layer frame $E_1$ has been delayed to the next period, the decoder 26 of FIG. 4 will decode the base layer frame $I_1$ and just store it in the frame memory 14 until the base layer frame $P_3$ and the enhancement frame $E_1$ is received.

In the second time period of FIG. 5, the enhancement layer frame $E_1$ and the base layer frame $P_3$ is transmitted. At this time, the decoder 26 of FIG. 4 will decode the base layer frame $P_3$ and again just store it in the frame memory 14 until the delayed enhancement frame $E_3$ is received and decoded. Further, the decoder 26 of FIG. 4 will decode the enhancement layer frame $E_1$ and combine it with the corresponding base layer frame $I_1$ previously stored in the frame memory 14 to form a frame of enhanced video.

In the third time period of FIG. 5, the base layer frame $B_2$ and the corresponding enhancement layer frame $E_2$ is transmitted at the same time. Thus, the decoder 26 of FIG. 4 will decode the base layer frame $B_2$ and the corresponding enhancement layer frame $E_2$ at the same time and then combine the decoded frames to form another frame of enhanced video.

In the fourth time period of FIG. 5, the enhancement layer frame $E_3$ and the base layer frame $P_5$ is transmitted. At this time, the decoder 26 of FIG. 4 will decode the base layer frame $P_5$ and again just store it in the frame memory 14 until the delayed enhancement frame $E_5$ is received and decoded. Further, the decoder 26 of FIG. 4 will decode the enhancement layer frame $E_3$ and combine it with the corresponding base layer frame $P_3$ previously stored in the frame memory 14 to form another frame of enhanced video. As can be seen from FIG. 5, the above-described process will continue until all of the enhancement and corresponding base layer frames transmitted in the subsequent time periods are decoded and combined to produce an enhanced video sequence.

Figure 6:
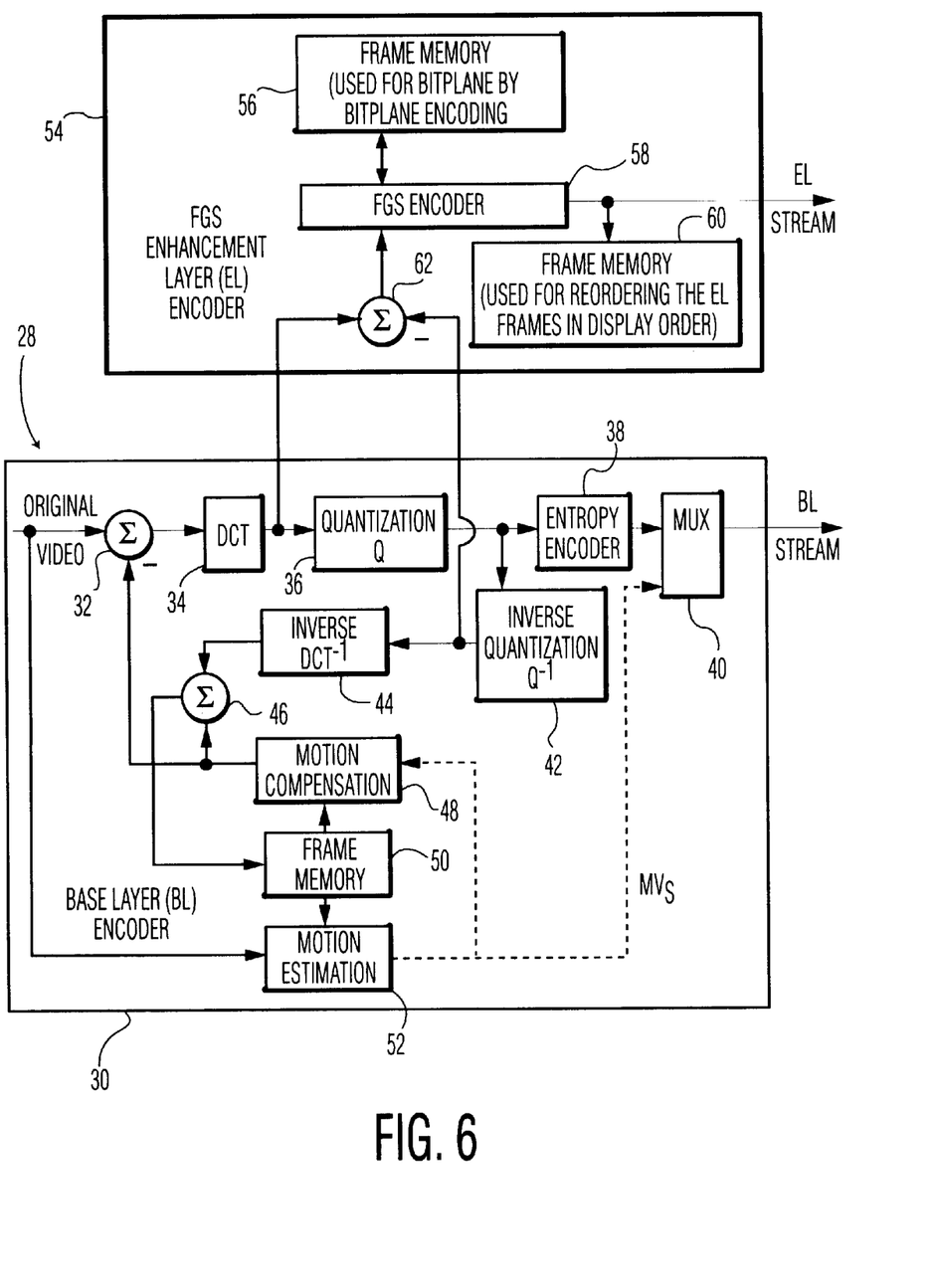
FIG. 6 is a block diagram showing one example of a encoder according to the present invention.

One example of an encoder according to the present invention is shown in FIG. 6. According to the present invention, the encoder will produce a stream of base layer frames and a stream of enhancement layer frames according to the transmission order shown in FIG. 3.

Figure 7:
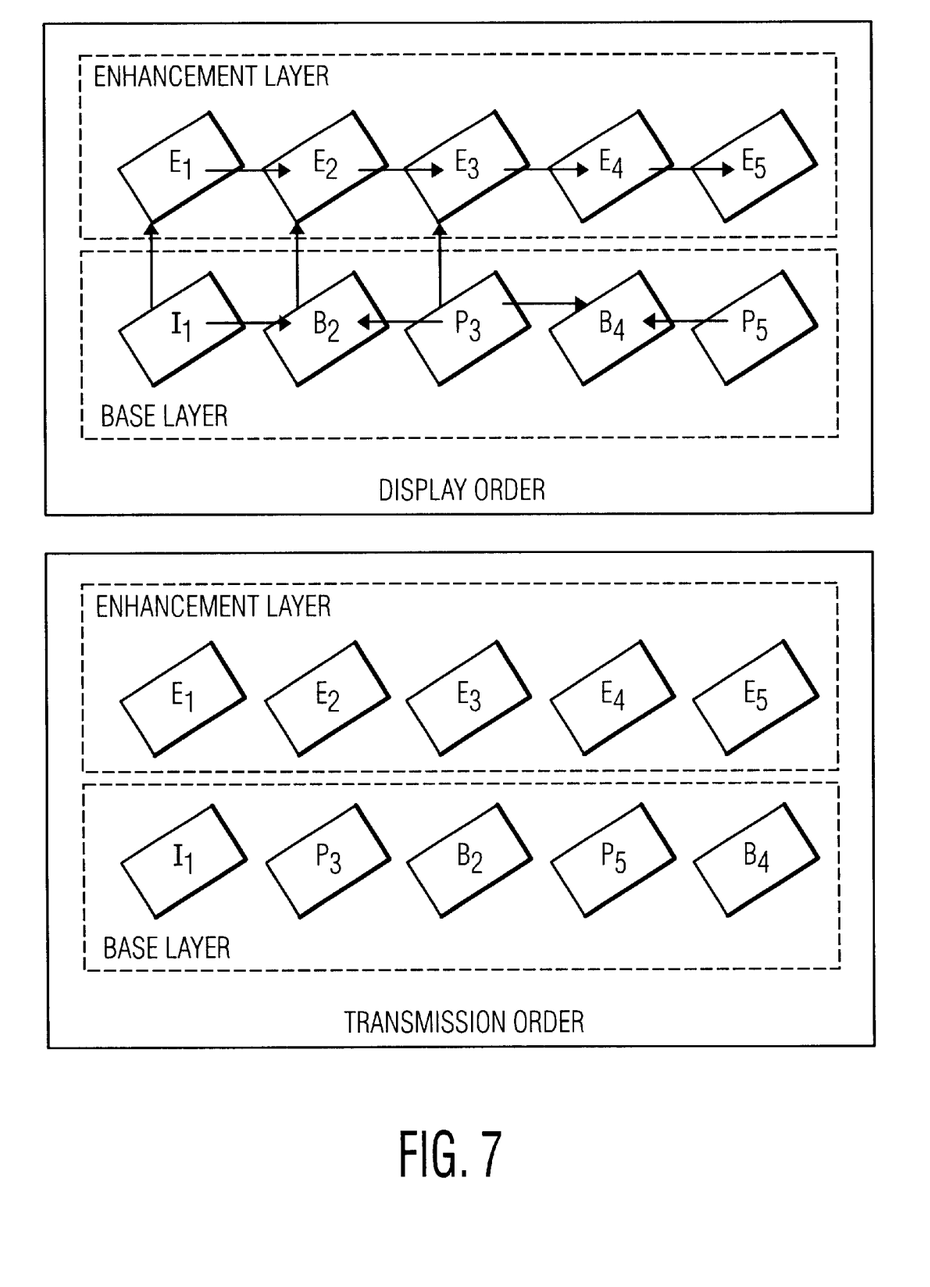
FIG. 7 is a diagram showing another example of the transmission and display order according to the present invention.

As can be seen from FIG. 7, the encoder 28 includes a base layer encoder 30 and enhancement layer encoder 54. The base layer encoder 30 includes a discrete cosine transform (DCT) block 34, a quantization block 36 and an entropy encoder 38 to encode the original video into I frames and the motion compensated residuals into P and B frames.

The layer base encoder 30 also includes an inverse quantization block 42, an IDCT block 44, an adder 46 and a compensation block 48 connected to the other input of the adder 46. During operation, these elements 42,44,46,48 provide a decoded version of the current frame being coded, which is stored in a frame memory 50.

A motion estimation block 52 is also included which produces the motion vectors from the current frame and a decoded version of the previous frame stored in the frame memory 50. The use of the decoded version of the previous frame enables the motion compensation performed on the decoder side to be more accurate since it is the same as received on the decoder side.

As can be further seen, the output of the motion compensation block 48 is also connected to one side of the subtracter 32. This enables motion compensated residuals based on predictions from previously transmitted coded frames to be subtracted from the current frame being coded. A multiplexer 40 is also included to combine the outputs of the entropy encoder 38 and the motion estimation block 52 to form the base layer stream.

The enhancement layer encoder 54 includes another subtracter 62. The subtracter 62 is utilized to subtract the output of the inverse quantization block 42 from the output of the DCT block 34 in order to form residual images. A fine granular scalable (FGS) encoder 58 is also included to encode the residual images produced by the subtracter 62. The residual images are encoded by performing bit-plane DCT scanning and entropy encoding. A frame memory 56 is connected to the FGS encoder 58, which is utilized to store each of the bit-planes after being decoded. After all of the bit-planes of the current frame are decoded, the frame memory 56 will output that frame.

As can be further seen, another frame memory 60 is connected to the output of the FGS encoder 60. According to the present invention, the frame memory 60 rearranges the enhancement layer frames into the transmission order shown in FIG. 3. In order to perform the rearrangement of the enhancement layer frames, the encoded enhancement layer frames are stored in the frame memory 60 and then transmitted according to the timing shown in FIG. 5.

As previously described, the transmission order of the enhancement layer frames is the same order as the frames are displayed on the decoder side. This is significant since it eliminates the need for one of the frame memories on the decoder-side, which is desirable for mobile and other low power applications.

Figure 8:
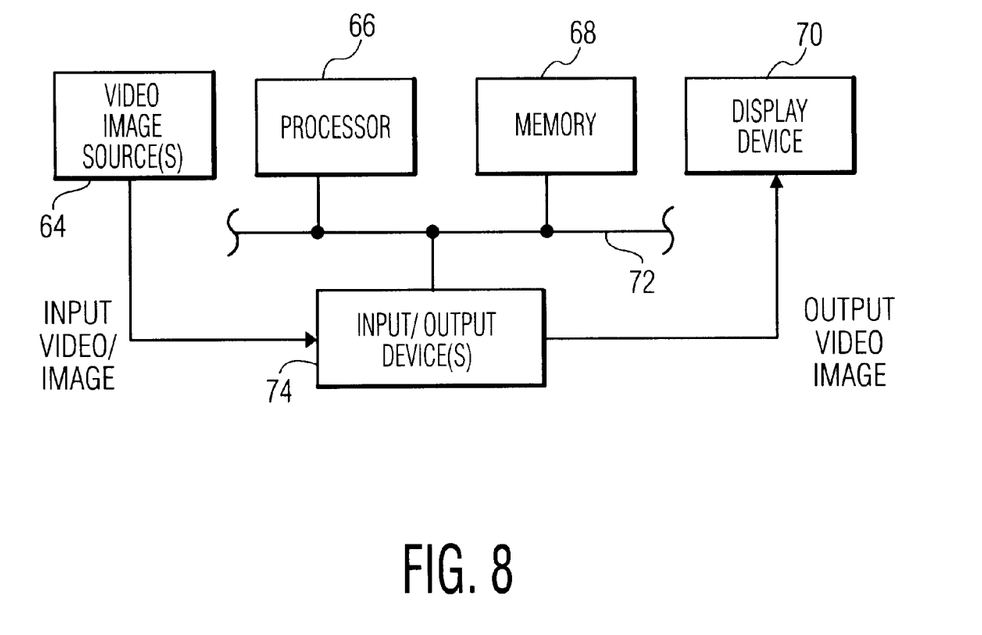
FIG. 8 is a block diagram showing one example of a system according to the present invention.

According to the present invention, in addition to the applicability of the present invention to enhancement-layers with no inter-enhancement prediction, the present invention is also applicable to the case where single direction prediction (i.e. no bi-directional MC prediction) is used with the enhancement layer. An example of this scenario is shown in FIG. 8.

The present invention is also applicable in the case where multiple enhancement layers are used on the top of the base layer. In this case, each of the enhancement layers can either have no intra-enhancement-layer prediction or has a single-direction prediction (from that enhancement layer or any other layer with the overall layered-coding structure).

One example of a system in which the present invention may be implemented is shown in FIG. 9. By way of examples, the system may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system includes one or more video sources 64, one or more input/output devices 74, a processor 66 and a memory 68.

The video/image source(s) 64 may represent, e.g., a television receiver, a VCR or other video/image storage device. The source(s) 74 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 74, processor 66 and memory 68 communicate over a communication medium 72. The communication medium 72 may represent, e.g., a bus, a communication network, one or more internal connections of a circuit, circuit card or other device, as well as portions and combinations of these and other communication media. Input video data from the source(s) 64 is processed in accordance with one or more software programs stored in memory 66 and executed by processor 66 in order to generate output video/images supplied to a display device 70.

In a preferred embodiment, the coding, decoding and rearranging of the enhancement layer frames described in conjunction with FIGS. 3–8 is implemented by computer readable code executed by the system. The code may be stored in the memory 68 or read/downloaded from a memory medium such as a CD-ROM or floppy disk. In other embodiments, hardware circuitry may be used in place of, or in combination with, software instructions to implement the invention. For example, the elements shown in FIGS. 4 and 7 also can be implemented as discrete hardware elements.

While the present invention has been described above in terms of specific examples, it is to be understood that the invention is not intended to be confined or limited to the examples disclosed herein. It should be noted that the application of the framework described herein goes beyond the examples shown in the figures. The present invention is applicable to all schemes employing motion compensation (MC) at the base-layer and having an enhancement-layer without MC (i.e. Intra coded). Therefore, this mechanism can be applied to all scalable schemes where no Bi-directional prediction is done within the enhancement-layer (i.e., with no intra-enhancement-layer prediction) or single direction prediction MC.

Further, the present invention is adaptable to any coding algorithm used for the enhancement-layer residual-progressive coding or normal quantization, wavelet or DCT etc. Examples of such enhancement-layer coding schemes are the MPEG-4 Fine-Granular-Scalability (FGS) method and the SNR scalability of MPEG-2, where no prediction in the enhancement layer is used.

What is claimed is:

1. A method of decoding a video signal including a base layer and an enhancement layer, wherein the enhancement layer includes enhancement frames arranged in a display order, comprising the steps of:
   decoding the base layer to produce decoded base layer frames;
   decoding the enhancement layer to produce decoded enhancement layer frames;
   combining the decoded base layer frames with the decoded enhancement layer frames without storing any of the decoded enhancement layer frames to form video frames.

2. The method according to claim 1, wherein the display order is an order the video frames are in when being displayed.

3. The method according to claim 1, wherein the display order of the enhancement frames includes an enhancement frame corresponding to a B-frame being placed between an enhancement frame corresponding to an I-frame and an enhancement frame corresponding to at least one P-frame.

4. The method according to claim 1, wherein the display order includes an enhancement frame corresponding to a B-frame being placed between enhancement frames corresponding to P-frames.

5. The method according to claim 1, wherein the enhancement layer frames are delayed with respect to the base layer.

6. A memory medium including a code for decoding a video signal including a base layer and an enhancement layer, wherein the enhancement layer includes enhancement frames arranged in a display order, the code comprising:
   a code to decode the base layer to produce decoded base layer frames;
   a code to decode the enhancement layer to produce decoded enhancement layer frames;
   a code to combine the decoded base layer frames with the decoded enhancement layer frames without storing any of the decoded enhancement layer frames to form video frames.

7. An apparatus for decoding a video signal including a base layer and an enhancement layer, wherein the enhancement layer includes enhancement frames arranged in a display order, the code comprising:

a first decoder to decode the base layer to produce decoded base layer frames;

a second decoder to decode the enhancement layer to produce decoded enhancement layer frames;

an adder to combine the decoded base layer frames with the decoded enhancement layer frames without storing any of the decoded enhancement layer frames to form video frames.

* * * * *